US011752690B2

(12) United States Patent
Mizoguchi

(10) Patent No.: US 11,752,690 B2
(45) Date of Patent: Sep. 12, 2023

(54) RESIN COMPOSITION AND METHOD FOR PRODUCING THREE-DIMENSIONALLY SHAPED OBJECT USING SAME

(71) Applicant: Konica Minolta, Inc., Tokyo (JP)

(72) Inventor: Keisuke Mizoguchi, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 550 days.

(21) Appl. No.: 16/474,188

(22) PCT Filed: Dec. 8, 2017

(86) PCT No.: PCT/JP2017/044160
§ 371 (c)(1),
(2) Date: Jun. 27, 2019

(87) PCT Pub. No.: WO2018/131352
PCT Pub. Date: Jul. 19, 2018

(65) Prior Publication Data
US 2019/0344499 A1 Nov. 14, 2019

(30) Foreign Application Priority Data

Jan. 12, 2017 (JP) ................................ 2017-003200

(51) Int. Cl.
| | |
|---|---|
| *B29C 64/153* | (2017.01) |
| *B33Y 70/00* | (2020.01) |
| *B29C 64/118* | (2017.01) |
| *C08K 5/00* | (2006.01) |
| *C08K 7/02* | (2006.01) |
| *C08L 1/02* | (2006.01) |
| *C08L 77/00* | (2006.01) |
| *B33Y 10/00* | (2015.01) |

(52) U.S. Cl.
CPC .......... *B29C 64/153* (2017.08); *B29C 64/118* (2017.08); *B33Y 70/00* (2014.12); *C08K 5/005* (2013.01); *C08K 7/02* (2013.01); *C08L 1/02* (2013.01); *C08L 77/00* (2013.01); *B33Y 10/00* (2014.12); *C08K 2201/011* (2013.01); *C08L 2207/04* (2013.01)

(58) Field of Classification Search
CPC ..... B29C 64/153; B29C 64/118; C08K 5/005; C08K 7/02; C08K 2201/011; C08L 1/02; C08L 77/00; C08L 2207/04; C08L 101/00; B33Y 10/00; B33Y 70/00; B29K 2105/124; B29K 2201/00
See application file for complete search history.

(56) References Cited

U.S. PATENT DOCUMENTS

| | | | | |
|---|---|---|---|---|
| 2016/0089720 A1* | 3/2016 | Kamakura | ............... | B22F 12/00 |
| | | | | 419/53 |
| 2017/0106593 A1* | 4/2017 | Khairallah | ............. | B33Y 30/00 |
| 2017/0232684 A1 | 8/2017 | Yoshimura | | |
| 2018/0147780 A1* | 5/2018 | Kamoda | ................ | B33Y 30/00 |

FOREIGN PATENT DOCUMENTS

| | | |
|---|---|---|
| CN | 103214738 A | 7/2013 |
| JP | 2008208231 A | 9/2008 |
| JP | 2016-147996 A | 8/2016 |
| JP | 2017170881 A | 9/2017 |
| JP | 2018-015955 A | 2/2018 |
| WO | 2016059986 A1 | 4/2016 |
| WO | 2016/129693 A1 | 8/2016 |
| WO | 2017141779 A1 | 8/2017 |

OTHER PUBLICATIONS

R. D. Goodridge et al., Polymer Testing 2011, 30, p. 94-100. (Year: 2011).*
International Search Report dated Mar. 13, 2018 for PCT/JP2017/044160 and English translation.
International Preliminary Report on Patentability for corresponding application No. PCT/JP2017/044160, dated Jul. 16, 2019 (8 pages).
CNIPA, Office Action for the corresponding Chinese Patent Application No. 201780083134.6, dated Dec. 2, 2020, with English translation.
JPO, Office Action for the corresponding Japanese Patent Application No. 2018-561863, dated Aug. 17, 2021, with English translation.
CNIPA, Office Action for the corresponding Chinese Patent Application No. 201780083134.6, dated Jun. 21, 2021, with English translation.
JPO, Office Action for the corresponding Japanese Patent Application No. 2018-561863, dated May 25, 2021, with English translation.

* cited by examiner

*Primary Examiner* — Michael M. Robinson
(74) *Attorney, Agent, or Firm* — LUCAS & MERCANTI, LLP

(57) ABSTRACT

The purpose of the present invention is to provide a resin composition for forming three-dimensionally shaped objects having high dimensional accuracy. In order to achieve the purpose, the resin composition is used in a three-dimensional shaping method wherein either forming a thin layer that comprises a particulate resin composition and selectively irradiating the thin layer with laser light are repeated or melt-extruding a resin composition into a filament shape and forming a layer of the filament-shaped extruded resin composition are repeated, thereby forming a three-dimensionally shaped object. The resin composition has a particulate or filament shape, comprises polysaccharide nanofibers and a resin, and has a content of the polysaccharide nanofibers of 1-70 mass %. In the resin composition, the maximum value of loss modulus at temperatures in the range of (melting temperature)±20° C. is 10-1,000 times the minimum value of loss modulus at temperatures in the range of (melting temperature)±20° C.

5 Claims, No Drawings

RESIN COMPOSITION AND METHOD FOR PRODUCING THREE-DIMENSIONALLY SHAPED OBJECT USING SAME

CROSS REFERENCE TO RELATED APPLICATION

This Application is a 371 of PCT/JP2017/044160 filed on Dec. 8, 2017 which, in turn, claimed the priority of Japanese Patent Application No. 2017-003200 filed on Jan. 12, 2017, both applications are incorporated herein by reference.

TECHNICAL FIELD

The present invention relates to a resin composition and a production method for a three-dimensionally shaped object using the resin composition.

BACKGROUND ART

In recent years, various methods by which a three-dimensionally shaped object having a complicated shape can be produced with comparative ease have been developed, and rapid prototyping and rapid manufacturing utilizing such methods have received a lot of attention. A fused deposition modeling technique and a powder bed fusion method are each known as a method for preparing a three-dimensionally shaped object.

In the fused deposition modeling technique, for example, a resin composition is melt-extruded into the shape of a filament to form, on a stage, a thin layer by finely dividing a three-dimensionally shaped object in the thickness direction. A three-dimensionally shaped object having a desired shape is obtained by repeating melt-extrusion and formation of a thin layer.

On the other hand, in a selective laser sintering technique, a thin layer is formed by smoothly spreading particles composed of a resin material or a metal material. Subsequently, a desired position on the thin layer is irradiated with laser light to selectively sinter or melt-bond (hereinafter also simply referred to as "melt-bond") adjacent particles. That is, a shaped object layer is also formed by finely dividing a three-dimensionally shaped object in the thickness direction by this method. A three-dimensionally shaped object having a desired shape is produced by repeating further spread of a powder material on the shaped object layer thus formed and irradiation with laser light.

Incidentally, a technique of adding nanocellulose to an optical film, thereby enhancing the tensile strength of the optical film is known (PTL 1).

CITATION LIST

Patent Literatures

PTL 1: Japanese Patent Application Laid-Open No. 2008-208231

SUMMARY OF INVENTION

Technical Problem

In the above-described fused deposition modeling technique and selective laser sintering technique among three-dimensional shaping methods, a three-dimensionally shaped object is obtained by stacking layers each composed of a molten product of a resin composition. In such methods, a layer formed earlier is cooled and cured earlier than a layer formed later. When the layer formed earlier undergoes volumetric shrinkage accompanying a change in temperature, distortion occurs to a resultant three-dimensionally shaped object.

Further, in these methods, when the time until the solidification of the layer composed of the molten product of the resin composition is long, the shape of the layer composed of the molten product is changed by gravity to lower the dimensional accuracy of a resultant three-dimensionally shaped object. On the other hand, when the time until the solidification of the resin composition after melting is too short, adjacent layers or adjacent particles are not sufficiently integrated to lower the dimensional accuracy of a resultant three-dimensionally shaped object. That is, in the conventional three-dimensional shaping methods using a resin composition, it has been difficult to produce a three-dimensionally shaped product with good dimensional accuracy.

The present invention has been completed in view of the above-described problems. That is, an object of the present invention is to provide a resin composition for preparing a three-dimensionally shaped object, the resin composition making dimensional accuracy of a resultant three-dimensionally shaped object high, and to provide a production method for a three-dimensionally shaped object using the resin composition.

Solution to Problem

The present invention provides the following resin composition.

[1] A resin composition to be used in a three-dimensional shaping method for forming a three-dimensionally shaped object by repeating formation of a thin layer comprising a particulate resin composition and selective irradiation of the thin layer with laser light, or repeating melt-extrusion of a resin composition and stacking of the resin composition extruded into a shape of a filament, the resin composition: being particulate or filamentous, comprising a polysaccharide nanofiber and a thermoplastic resin, and having a content of the polysaccharide nanofiber of 1 to 70 mass %, wherein a maximum value of loss modulus in a range of a melting temperature±20° C. is 10 to 1,000 times a minimum value of the loss modulus in the range of the melting temperature±20° C.

[2] The resin composition according to [1], wherein the polysaccharide nanofiber has a minor axis of 3 to 30 nm and a major axis of 200 to 2,000 nm.

[3] The resin composition according to [1] or [2], wherein the polysaccharide nanofiber comprises a cellulose nanofiber.

[4] The resin composition according to any one of [1] to [3], the resin composition is to be used in the three-dimensional shaping method for forming a three-dimensionally shaped object by repeating formation of a thin layer comprising a particulate resin composition and selective irradiation of the thin layer with laser light.

The present invention also provides the following production method for a three-dimensionally shaped object.

[5] A production method for a three-dimensionally shaped object, the method comprising: forming a thin layer comprising the particulate resin composition according to any one of [1] to [4], and selectively irradiating the thin layer with laser light, thereby forming a shaped object layer comprising a plurality of the resin compositions melt-bonded to one another, wherein the forming of a thin layer and the irradiating with laser light are repeated a plurality of times to stack the shaped object layers, thereby shaping a three-dimensionally shaped object.

[6] A production method for a three-dimensionally shaped object, the method comprising: melting the resin composition according to any one of [1] to [4], and extruding the molten resin composition into a shape of a filament, thereby forming a thin layer comprising the resin composition, wherein the melting of the resin composition and the forming of a thin layer are repeated a plurality of times to stack the thin layers, thereby shaping a three-dimensionally shaped object.

Advantageous Effects of Invention

According to the present invention, a resin composition for preparing a three-dimensionally shaped object, the resin composition making dimensional accuracy of a resultant three-dimensionally shaped object high, and a production method for a three-dimensionally shaped object using the resin composition can be provided.

DESCRIPTION OF EMBODIMENTS

1. Resin Composition

A resin composition of the present invention is used for three-dimensional shaping by the fused deposition modeling technique or the selective laser sintering technique. The shape of the resin composition of the present invention is particulate or filamentous, and the resin composition contains a polysaccharide nanofiber and a thermoplastic resin.

As described above, in the three-dimensional shaping by the fused deposition modeling technique and the selective laser sintering technique, a three-dimensionally shaped object is obtained by stacking layers each composed of a molten product of a resin composition. In the method, a layer formed earlier is cooled and cured earlier than a layer formed later. When the layer formed earlier undergoes volumetric shrinkage accompanying a change in temperature, distortion has been liable to occur to a resultant three-dimensionally shaped object to make the dimensional accuracy of the resultant three-dimensionally shaped object liable to be lowered. Further, when the time until the resin composition solidifies after melting is too long, the shape of the resin composition is liable to be changed by gravity. On the other hand, when the time until the resin composition solidifies after melting is too short, there has also been a problem in that adjacent resin compositions are not sufficiently integrated.

To solve these problems, the present inventors have conducted diligent studies to find that a three-dimensionally shaped object can be formed with good accuracy by allowing a polysaccharide nanofiber to be contained in the resin composition in an amount of 1 to 70 mass %. The polysaccharide nanofiber is in a state of being dispersed in a thermoplastic resin at a high temperature (for example, a temperature equal to or higher than the melting point of the resin composition (resin)), but nanofibers form hydrogen bonds as the temperature falls, forming a three dimensional network structure in the resin composition. When such a network structure is formed, it is hard for the volumetric shrinkage to occur during cooling and solidification of the resin composition, making the dimensional accuracy hard to lower. In addition, when the nanofibers form the network structure in the resin composition, the viscosity of the resin composition increases. That is, when the resin composition melts, the viscosity is sufficiently low to make the molten resin compositions integrated. On the other hand, the viscosity of the resin composition increases at an early stage after the resin composition melts, making it hard for a change in the shape to occur. Accordingly, the dimensional accuracy of a resultant three-dimensionally shaped object is made high.

However, when the viscosity of the molten resin composition increases extremely faster, the nanofibers cannot sufficiently form the network structure. As a result, the molten resin compositions cannot be sufficiently integrated, and it is hard to sufficiently suppress the cure shrinkage. On the other hand, in the case where the time until the viscosity of the molten resin composition increases is too long, it is hard to sufficiently suppress the deformation and the like of the resin composition by gravity. Thus, in the resin composition of the present invention, the maximum value of the loss modulus in a range of the melting temperature±20° C. is 10 to 1,000 times the minimum value of the loss modulus in the range of the melting temperature±20° C. That is, in the resin composition of the present invention, the viscosity of the resin composition appropriately changes in a range close to the melting temperature (in the range of the melting temperature±20° C.). Accordingly, excessive deformation of the molten resin composition can be suppressed, and the molten resin compositions can be integrated. That is, according to the resin composition, a three-dimensionally shaped product having high dimensional accuracy can be obtained.

The content of the polysaccharide nanofiber in the resin composition is preferably 5 to 50 mass %, and more preferably 10 to 40 mass %. When the amount of the polysaccharide nanofiber is in the range, the dimensional accuracy of a resultant three-dimensionally shaped object is more enhanced.

In addition, the maximum value of the loss modulus in the range of the melting temperature±20° C. is preferably 30 to 500 times the minimum value of the loss modulus in the range of the melting temperature±20° C., and more preferably 50 to 200 times. When the ratio of the maximum value to the minimum value of the loss modulus in the range of the melting temperature±20° C. is in the range, the polysaccharide nanofiber can sufficiently form a network structure, and the deformation of the molten resin composition is moderate. Accordingly, the dimensional accuracy of a resultant three-dimensionally shaped object is more enhanced.

Hereinafter, the polysaccharide nanofiber and the resin contained in the resin composition of the present invention will be described.

(Polysaccharide Nanofiber)

The polysaccharide nanofiber is not particularly limited as long as it is a fiber that can form the above-described network structure by forming hydrogen bonds in the resin composition, the fiber having an average diameter of 1,000 nm or less and being derived from a polysaccharide. The polysaccharide nanofiber can be an aggregate containing a nanofibril formed by aggregation of a polysaccharide, or a derivative thereof, the aggregate having an average fiber diameter of 1,000 nm or less. Only one polysaccharide nanofiber, or two or more polysaccharide nanofibers may be contained in the resin composition.

The polysaccharide nanofiber may be chemically modified in order to enhance the affinity with a thermoplastic resin which will be described later, or may be treated by any of various methods such as, for example, an acetylation treatment, a carboxymethylation treatment, and a treatment with a silane coupling agent. In addition, the polysaccharide nanofiber may be an untreated polysaccharide nanofiber on which any of the above-described treatments have not been performed.

In addition, the polysaccharide nanofiber may contain a component other than polysaccharides or derivatives thereof in a range that does not impair the object of the present invention; however, the polysaccharide or a derivative thereof accounts for preferably 50 mass % or more, preferably 70 mass % or more, more preferably 80 mass % or more, still more preferably 90 mass % or more, and particularly preferably 99 mass % or more based on the total mass of the nanofiber.

The structure of the polysaccharide nanofiber is not particularly limited and may be a polysaccharide nanofiber composed of a single strand or having a branched structure. Having a branched structure means that a branched chain protruding laterally relative to the main chain containing a nanofibril as the main component exists.

In addition, the average fiber diameter of the polysaccharide nanofiber is preferably 3 nm or more and 30 nm or less. When the average fiber diameter is 3 nm or more, the strength of a resultant three-dimensionally shaped object is easily enhanced, and when the average fiber diameter is 30 nm or less, a fine network structure is easily formed in the molten product of the resin composition to easily enhance the dimensional accuracy of a resultant three-dimensionally shaped object. Moreover, the average fiber diameter of the polysaccharide nanofiber is more preferably 3 nm or more and 20 nm or less, and still more preferably 5 nm or more and 20 nm or less.

On the other hand, the average fiber length of the polysaccharide nanofiber is preferably 200 nm or more and 2,000 nm or less, and more preferably 200 nm or more and 1,000 nm or less. When the average fiber length is 2,000 nm or less, it is easy to process the resin composition into the shape of a particle or the shape of a filament. Moreover, particularly when the average fiber length is 1,000 nm or less, the size of the network structure constituted by the polysaccharide nanofibers is easily made appropriate to make it easy to enhance the shaping accuracy. On the other hand, when the average fiber length is 200 nm or more, a network structure having high strength is easily formed inside the molten product of the resin composition. The average fiber length of the polysaccharide nanofiber is still more preferably 300 nm or more and 1,000 nm or less, and particularly preferably 500 nm or more and 1,000 nm or less. It is to be noted that in the case where the polysaccharide nanofiber has a branched structure, the length in the case where the nanofiber is longest is defined as the fiber length.

The aspect ratio (a value obtained by dividing the average fiber length by the average fiber diameter) of the polysaccharide nanofiber is preferably 20 or more and 350 or less, and more preferably 50 or more and 300 or less. When the aspect ratio is in the range, a network structure having high strength is easily formed inside the molten product of the resin composition.

The average fiber diameter and average fiber length of the polysaccharide nanofiber can be determined as follows. Firstly, the resin, which will be described later, is removed from the resin composition, and only the nanofibers are taken out. Subsequently, from an image obtained by imaging the nanofibers with a transmission electron microscope (TEM), the arithmetic mean of the fiber diameters and of the fiber lengths of 100 nanofibers arbitrarily selected can be determined as the average fiber diameter and the average fiber length.

It is to be noted that when the above-described measurement is conducted, the resin composition diluted by a factor of about 1,000 to about 10,000 with a solvent, such as methyl ethyl ketone, which is optically transparent and which does not react with the nanofiber is preferably imaged with a TEM so that the nanofibers do not overlap one another. The magnifications of the TEM may be adjusted to such an extent that 100 or more nanofibers can be imaged.

Examples of the polysaccharide constituting the nanofiber include cellulose, hemicellulose, lignocellulose, chitin, and chitosan. Among these, from the viewpoint of having high strength, having a small coefficient of thermal expansion, and being lightweight, cellulose nanofibers, or nanofibers of derivatives of cellulose (hereinafter, also referred to as "nanocellulose") is preferably used.

The nanocellulose may be a cellulose nanofiber obtained by mechanical defibration of a plant-derived fiber or a plant cell wall, biosynthesis by an acetic acid bacterium, oxidation by an N-oxyl compound such as a 2,2,6,6-tetramethylpiperidine-1l-oxyl radical (TEMPO), or an electrospinning method, the cellulose nanofiber containing the nanofibril which is fibrous as the main component. In addition, the nanocellulose may also be a cellulose nanocrystal obtained by mechanically defibrating a plant-derived fiber or a plant cell wall and thereafter performing an acid treatment, the cellulose nanocrystal containing the nanofibril crystallized into the shape of a whisker (needle-like shape) as the main component. The nanocellulose may have other shapes.

In addition, lignin, hemicellulose, and the like may be contained together with cellulose in the nanocellulose. Nanocellulose which is not subjected to a delignification treatment, the nanocellulose containing lignin, which is hydrophobic, is preferable because of having high affinity with thermoplastic resins, which will be described later.

Further, the nanocellulose may be subjected to a hydrophobization treatment in order to enhance the affinity between the nanocellulose and the thermoplastic resin. The hydrophobization method can be a known method. Specifically, the hydrophobization method can be a method of subjecting the cellulose nanofiber, the cellulose nanocrystal, or the like to an acetylation treatment, a carboxylation treatment, a carboxymethylation treatment, an acylation treatment, an alkylation treatment, a treatment with a polyethylenediamine, or a silane coupling treatment with a triethoxysilane or the like.

It is to be noted that the shape (the existence of the branched structure or not, the average fiber diameter, the average fiber length, the aspect ratio, and the like) of the polysaccharide nanofiber can be adjusted to fall within the above-described ranges by changing the method for producing the polysaccharide nanofiber by a known method. For example, when the polysaccharide nanofiber is the nanocellulose, the shape can be adjusted by adjusting a defibration or synthesis method (such as the intensity of defibration), the number of times of defibration, and the like.

(Thermoplastic Resin)

The thermoplastic resin contained in the resin composition is not particularly limited as long as it is a thermoplastic resin that has high compatibility with the polysaccharide nanofiber and can be melted by heating, and is appropriately selected according to the type of a desired three-dimensionally shaped object and the method of forming a three-dimensionally shaped object. As the thermoplastic resin, resins contained in general particles for selective laser sintering and resins contained in filaments for fused deposition modeling can be used. Only one thermoplastic resin, or two or more thermoplastic resins may be contained in the resin composition.

However, when the melting temperature of the thermoplastic resin is too high, the need to heat the resin composition to a high temperature arises in order to melt the resin composition when a three-dimensionally shaped object is formed, so that there are some cases where forming a three-dimensionally shaped object requires a time, the above-described polysaccharide nanofiber is deteriorated, and other cases. Thus, the melting temperature of the thermoplastic resin is preferably 300° C. or less, and more preferably 230° C. or less. On the other hand, from the viewpoint of the heat resistance and the like of a resultant three-dimensionally shaped object, the melting temperature of the thermoplastic resin is preferably 100° C. or more, and more preferably 150° C. or more. The melting temperature can be adjusted according to the type and the like of the thermoplastic resin.

In the resin composition for selective laser sintering, the thermoplastic resin can be, for example, polyamide 12, polylactic acid, an ABS (acrylic-butadiene-styrene copolymer) resin, polycarbonate, and polypropylene.

On the other hand, in the resin composition for fused deposition modeling, the thermoplastic resin can be, for example, polyamide 12, polyamide 11, polypropylene, and polyamide 6.

(Other Materials)

In the resin composition, components other than the polysaccharide nanofiber and the thermoplastic resin may be contained in a range that does not impair the object of the present invention. Examples of other materials include various additives, fillers, and laser absorbers.

Examples of the various additives include an antioxidant, acid compounds and derivatives thereof, a lubricant, an ultraviolet absorber, a light stabilizer, a nucleating agent, a flame retardant, a shock improver, a foaming agent, a colorant, an organic peroxide, a spreading agent, and an adhesive. Only one, or two or more of these may be contained in the resin composition. In addition, these may be applied on the surface of the resin composition in a range that does not impair the object of the present invention.

Examples of the fillers include: inorganic fillers such as talc, calcium carbonate, zinc carbonate, wollastonite, silica, alumina, magnesium oxide, calcium silicate, sodium aluminate, calcium aluminate, sodium aluminosilicate, magnesium silicate, a glass balloon, a glass cut fiber, a glass milled fiber, a glass flake, a glass powder, silicon carbide, silicon nitride, gypsum, a gypsum whisker, calcined kaolin, carbon black, zinc oxide, antimony trioxide, zeolite, hydrotalcite, a metal fiber, a metal whisker, a metal powder, a ceramic whisker, potassium titanate, boron nitride, graphite, and a carbon fiber; organic fillers other than the polysaccharide nanofibers; and various polymers. Only one, or two or more of these may be contained in the resin composition.

In addition, examples of the laser absorbers include carbon powders, nylon resin powders, pigments, and dyes. Only one, or two or more of these laser absorbers may be contained in the resin composition.

(Physical Properties)

The resin composition preferably has a melting temperature of 100 to 300° C., and more preferably 150 to 230° C. When the melting temperature is in the range, a shaped object can be formed without performing excessive heating in the method for forming a three-dimensionally shaped object, which will be described later. The melting temperature of the resin composition can be adjusted according to the type and the like of the thermoplastic resin.

On the other hand, the shape of the resin composition is appropriately selected according the use of the resin composition. For example, in the case where the resin composition is used for selective laser sintering, the resin composition is made particulate. The shape of the particle can be a spherical shape, a polygonal column, a circular cylinder, an elliptic cylinder, an indefinite shape in which shapes which are out of shape of these shapes are mixed, or the like, and is preferably spherical from the viewpoint of enhancing the dimensional accuracy of a three-dimensionally shaped object. The average particle diameter of the particulate resin composition is preferably 1 μm or more and 200 μm or less, more preferably 2 μm or more and 150 μm or less, still more preferably 5 μm or more and 100 μm or less, and further still more preferably 5 μm or more and 70 μm or less. When the average particle diameter of the resin composition is 1 μm or more, the resin composition is likely to have sufficient fluidity to make handling of the resin composition easy. Moreover, when the average particle diameter is 1 μm or more, preparation of the particulate resin composition is easy and the cost of producing the resin composition does not increase. The average particle diameter is defined as a volume average particle diameter measured by a dynamic light scattering method. The volume average particle diameter can be measured with a laser diffraction particle size analyzer (manufactured by MicrotracBEL Corp., MT3300EXII) equipped with a wet disperser.

In the case where the resin composition is used for fused deposition modeling, the resin composition can be filamentous. The average diameter of the filamentous resin composition is appropriately selected according to the type of a three-dimensional shaping apparatus and is usually preferably 1.0 to 5.0 mm, and preferably 1.3 to 3.5 mm. If necessary, the filamentous resin composition may have fine unevenness formed on the surface thereof so as to be sufficiently held in a three-dimensional shaping apparatus. In addition, the filamentous resin composition may be wounded around a bobbin.

(Production Method)

The production method for the resin composition is not particularly limited and can be a known production method. For example, the particulate resin composition can be obtained in such a way that the thermoplastic resin, the polysaccharide nanofiber, and optionally other components are stirred and mixed while being heated, and then cooled, or by other methods. In addition, mechanical pulverization, classification, and the like may be performed in order to equalizing the average particle diameters of the resin compositions.

On the other hand, the filamentous resin composition can be obtained by a method in which the thermoplastic resin, the polysaccharide nanofiber, and optionally other components are melt-kneaded, and then molded into the shape of a filament by a known molding method, such as extrusion molding. The temperature during extrusion molding is appropriately selected according to the melting temperature of the resin composition.

2. Production Method for Three-Dimensionally Shaped Object

The resin composition can be used in a production method for a three-dimensionally shaped object by the fused deposition modeling technique or the selective laser sintering technique as described above. Hereinafter, the three-dimensional shaping methods using the resin composition will be described.

2-1. Production Method for Three-Dimensionally Shaped Object by Selective Laser Sintering Technique The production method for a three-dimensionally shaped object by the selective laser sintering technique can be performed in the same manner as in usual selective laser sintering except that the resin composition is used. Specifically, the method can be a method including (1) forming a thin layer containing the above-described particulate resin composition, (2) selectively irradiating the thin layer containing the resin composition with laser light, thereby forming a shaped object layer containing the particulate resin compositions melt-bonded to one another. The three-dimensionally shaped object can be produced by repeating the process (1) and the process (2) multiple times to stack the shaped object layers. It is to be noted that if necessary, the production method for a three-dimensionally shaped object may include other processes such as, for example, preliminarily heating the resin composition.

Forming Thin Layer (Process (1))

In the present process, the thin layer containing the particulate resin composition is formed. For example, the resin composition supplied from a powder supply section of a three-dimensional shaping apparatus is spread smoothly all over a shaping stage by a recoater. The thin layer may be formed directly on the shaping stage or may be formed on the powder material which has already been spread or a shaped object layer which has already been formed so as to be in contact therewith. It is to be noted that if necessary, the resin composition may be mixed and used with a flow agent or a laser absorber, which will be described later.

The thickness of the thin layer is the same as that of a desired shaped object layer. The thickness of the thin layer can be arbitrarily set according to the accuracy of the three-dimensionally shaped object to be produced and is usually 0.01 mm or more and 0.30 mm or less. When the thickness of the thin layer is 0.01 mm or more, melt-bonding of the resin compositions existing on the layer below by irradiation with laser light for forming a next shaped object layer can thereby be suppressed, and further, uniform spreading of the powder is enabled. In addition, when the thickness of the thin layer is 0.30 mm or less, the energy of the laser light is thereby conducted to a lower part of the thin layer, so that the resin compositions constituting the thin layer are sufficiently melt-bonded over the whole range in the direction of thickness. From the above-described viewpoint, the thickness of the thin layer is more preferably 0.01 mm or more and 0.10 mm or less. In addition, from the viewpoint of melt-bonding the resin compositions more sufficiently over the whole range in the direction of thickness of the thin layer to make it harder to cause a crack in the shaped object layer, the thickness of the thin layer is preferably set so that the difference between the thickness and the beam spot diameter of the laser light, which will be described later, falls within 0.10 mm.

Examples of the laser absorber that can be mixed with the resin composition include carbon powders, nylon resin powders, pigments, and dyes. The amount of the laser absorber can be appropriately set in a range where melt-bonding of the resin compositions is made easy. For example, the amount of the laser absorber can be more than 0 mass % and less than 3 mass % based on the total mass of the resin composition. Only one laser absorber may be used, or two or more laser absorbers may be used in combination.

On the other hand, the flow agent that can be mixed with the resin composition may be a material having a small friction coefficient and having a self-lubricating property. Examples of such a flow agent include silicon dioxide and boron nitride. Only one of these flow agents may be used, or two or more of these flow agents may be used in combination. The amount of the flow agent can be appropriately set in a range where the fluidity of the resin composition is improved, and melt-bonding of the resin compositions occur sufficiently, and can be more than 0 mass % and less than 2 mass % based on the total mass of the resin composition.

Irradiation with Laser Light (Process (2))

In the present process, a position to form the shaped object layer in the thin layer containing the resin composition is selectively irradiated with the laser light to melt-bond the resin compositions at the position irradiated with the laser light. The molten resin composition and the adjacent resin compositions are melted into one another to form a melt-bonding body to be the shaped object layer. On this occasion, the resin composition which receives the energy of the laser light is also melt-bonded to the shaped object body layer which has already been formed, and therefore adhesion between adjacent layers also occurs.

The wavelength of the laser light may be set within a range of wavelengths where absorption of the resin composition occurs. On this occasion, the difference between the wavelength of the laser light and the wavelength where the absorption rate of the resin composition is highest is preferably made small; however, resins generally absorbs light of various wavelength regions, and therefore laser light having a wide wavelength band, such as $CO_2$ laser, is preferably used. For example, the wavelength of the laser light can be 0.8 μm or more and 12 μm or less.

The power of the laser light during output may be set within a range where the resin compositions are sufficiently melt-bonded at a scanning speed of the laser light, which will be described later. Specifically, the power can be 5.0 W or more and 60 W or less. From the viewpoint of lowering the energy of the laser light to reduce the production cost and making the configuration of an apparatus simple, the power of the laser light during output is preferably 30 W or less, and more preferably 20 W or less.

The scanning speed of the laser light may be set within a range where the production cost is not increased, and the configuration of an apparatus is not made excessively complicated. Specifically, the scanning speed is preferably 1 μm/sec or more and 10 μm/sec or less, more preferably 2 μm/sec or more and 8 μm/sec or less, and still more preferably 3 μm/sec or more and 7 μm/sec or less.

The beam diameter of the laser light can be appropriately set according to the accuracy of a three-dimensionally shaped product to be produced.

Repeating Process (1) and Process (2)

The above-described process (1) and process (2) are repeated an arbitrary number of times in producing a three-dimensionally shaped object. The shaped object layers are thereby stacked to obtain a desired three-dimensionally shaped object.

Preliminary Heating

As described above, preliminary heating of the resin composition may be performed in the production method for a three-dimensionally shaped object by the selective laser sintering technique. The preliminary heating of the resin composition may be performed after forming the thin layer (process (1)) or may be performed before forming the thin layer. Alternatively, the preliminary heating may be performed before and after forming the thin layer.

The temperature of the preliminary heating is a temperature lower than the melting temperature of the resin composition so that the resin compositions are not melt-bonded to one another. The temperature of the preliminary heating is appropriately selected according to the melting temperature of the resin composition and can be, for example, 50° C. or more and 300° C. or less, more preferably 100° C. or more and 230° C. or less, and still more preferably 150° C. or more and 190° C. or less.

On this occasion, the heating time is preferably 1 to 30 seconds and more preferably 5 to 20 seconds. By performing the preliminary heating at the above-described temperature for the above-described time, the time until the resin composition is melted when irradiated with laser energy can be made short and a three-dimensionally shaped object can be produced in a small quantity of laser energy.

Others

From the viewpoint of preventing lowering of the strength of a three-dimensionally shaped object due to oxidation or the like of the resin composition during melt-bonding, at least the process (2) is preferably performed under a reduced pressure or in an inert gas atmosphere. The pressure after being reduced is preferably $10^{-2}$ Pa or less, and more preferably $10^{-3}$ Pa or less. Examples of the inert gas that can be used include a nitrogen gas and rare gases. Among these inert gases, a nitrogen ($N_2$) gas, a helium (He) gas, or an argon (Ar) gas is preferable from the viewpoint of availability. From the viewpoint of simplifying production processes, both of the process (1) and the process (2) are preferably performed under a reduced pressure or in an inert gas atmosphere.

2-2. Production Method for Three-Dimensionally Shaped Object by Fused Deposition Modeling Technique The production method for a three-dimensionally shaped object by the fused deposition modeling technique can be performed in the same manner as in usual fused deposition modeling except that the resin composition is used. Specifically, the method can be a method including (1) melting the above-described resin composition and (2) extruding the molten resin composition into the shape of a filament, thereby forming a thin layer containing the resin composition. A three-dimensionally shaped object can be produced by repeating the process (1) and the process (2) multiple times to stack the thin layers. It is to be noted that if necessary, the production method for a three-dimensionally shaped object may include other processes.

Melting Process (Process (1))

In the present process, at least part of the resin composition is melted. For example, the resin composition is melted by a heat-melting device of a three-dimensional shaping apparatus equipped with an extruding head and a heat-melting device. The shape of the resin composition to be used is not particularly limited and may be, for example, particulate or pellet-shaped as long as the resin composition can be extruded into the shape of a filament from an extruding head in forming a thin layer, which will be described later. However, from the viewpoint of easiness of stabilizing the feed of the resin composition into the heat-melting device and other reasons, filamentous resin compositions are preferably used.

In the case of supplying a filamentous resin composition into a heat-melting device, it is general that filaments are engaged with a driving roll, such as, for example, a nip roll and a gear roll, to supply the resin composition while the resin composition is pulled.

Heating by a heat-melting device or the like is preferably performed so that the temperature of the resin composition can be equal to or higher than the melting temperature, and more preferably performed so that the temperature of the resin composition can be a temperature that is higher by 10° C. or more than the melting temperature. Specifically, heating is preferably performed to 100 to 300° C., and heating is more preferably performed to 150 to 230°. When the temperature of the resin composition is 300° C. or less, thermal decomposition or the like of the polysaccharide nanofiber in the resin composition can be prevented. Moreover, the resin composition can be efficiently melted. On the other hand, when the temperature of the resin composition is 100° C. or more, the resin composition can thereby be sufficiently melted, so that the dimensional accuracy of a resultant three-dimensionally shaped object is enhanced.

Forming Thin Layer (Process (2))

In the present process, the molten resin composition is extruded into the shape of a filament to form a thin layer composed of the resin composition. For example, the resin composition which has been melted in the above-described melting process is extruded into the shape of a filament on a shaping stage from a nozzle of an extruding head of a three-dimensional shaping apparatus to form a thin layer into a desired shape.

The diameter of the filamentous resin composition to be ejected from an extruding head is preferably 0.01 to 1 mm, and more preferably 0.02 to 0.8 mm. The diameter of the resin composition corresponds to the thickness of the thin layer. Therefore, when the thickness of the resin composition is in the above-described range, the reproducibility of a resultant three-dimensionally shaped object is thereby likely to be favorable.

In addition, the extrusion speed of the resin composition is preferably 20 mm/sec or more, more preferably 30 mm/sec or more, and still more preferably 50 mm/sec or more. On the other hand, the extrusion speed is usually 200 mm/sec or less.

EXAMPLES

Hereinafter, specific Examples of the present invention will be described. It is to be noted that the scope of the present invention should not be construed as limited to these Examples.

<Preparation of Nanocellulose>

Carboxymethyl cellulose manufactured by Sugino Machine Limited was defibrated repeatedly with Nanovater manufactured by YOSHIDA KIKAI CO., LTD until the minor axis and major axis as the size of nanocellulose were as shown in Table 1, and the nanocellulose was then dried.

Preparation of Filamentous Resin Compositions

Example 1

The defibrated nanocellulose and a polyamide 12 resin ((hereinafter, also referred to as "PA12") manufactured by Daicel-Evonik Ltd., DAIAMID L1600) were mixed so that the proportion of the nanocellulose was 1 mass %, and a resultant mixture was loaded into a small-sized kneader manufactured by Xplore Instruments BV and kneaded at 180° C. and at 100 rpm to thereafter prepare a filamentous resin composition (hereinafter, also simply referred to as a "filament") of 1.75 mm.

Example 2

A filament was prepared in the same manner as in Example 1 except that mixing was performed so that the proportion of the nanocellulose was 30 mass %, and a resultant mixture was loaded into the kneader.

Example 3

A filament was prepared in the same manner as in Example 1 except that mixing was performed so that the proportion of the nanocellulose was 70 mass %, and a resultant mixture was loaded into the kneader.

Comparative Example 1

A filament was prepared in the same manner as in Example 1 except that mixing was performed so that the proportion of the nanocellulose was 0.5 mass %, and a resultant mixture was loaded into the kneader.

Comparative Example 2

A filament was prepared in the same manner as in Example 1 except that mixing was performed so that the proportion of the nanocellulose was 75 mass %, and a resultant mixture was loaded into the kneader.

<Shaping Test by Fused Deposition Modeling (FDM)>

Filaments prepared in the Examples and Comparative Examples were each set on a three-dimensional shaping apparatus (manufactured by Zortrax, M200). Test pieces for evaluating shaping accuracy were each prepared at a melting temperature of 180° C.

<Preparation of Particulate Resin Compositions>

Example 4

In a 100-L autoclave stirring tank, 1 kg of a PA12 resin (manufactured by Daicel-Evonik Ltd., DAIAMID L1600), 25 L of ethanol, and 10.1 g of the nanocellulose (1 mass % in the resin composition) were stirred at 145° C. for 1 hour. Thereafter, the autoclave was cooled to a temperature of 117° C. to keep the temperature constant for 60 minutes. Subsequently, the resin composition was cooled to obtain a particulate resin composition (hereinafter, also simply referred to as a "particle") having an average particle diameter of 50 μm.

Example 5

A particle was prepared in the same manner as in Example 4 except that mixing was performed so that the proportion of the nanocellulose was 30 mass %.

Example 6

A particle was prepared in the same manner as in Example 4 except that mixing was performed so that the proportion of the nanocellulose was 70 mass %.

Comparative Example 3

A particle was prepared in the same manner as in Example 4 except that mixing was performed so that the proportion of the nanocellulose was 0.5 mass %.

Comparative Example 4

A particle was prepared in the same manner as in Example 4 except that mixing and loading were performed so that the proportion of the nanocellulose was 75 mass %.

Example 7

A particle was prepared in the same manner as in Example 5 except that nanocellulose subjected to defibration repeatedly until the size was $\phi 3$ nm×200 nm was used.

Example 8

A particle was prepared in the same manner as in Example 5 except that nanocellulose subjected to defibration repeatedly until the size was $\phi 3$ nm×1,000 nm was used.

Example 9

A particle was prepared in the same manner as in Example 5 except that nanocellulose subjected to defibration repeatedly until the size was $\phi 20$ nm×200 nm was used.

Example 10

A particle was prepared in the same manner as in Example 5 except that nanocellulose subjected to defibration repeatedly until the size was $\phi 20$ nm×1,000 nm was used.

Comparative Example 5

A particle was prepared in the same manner as in Example 5 except that the nanocellulose was changed to a monolayered carbon nanotube (manufactured by Sigma-Aldrich, Co. LLC, $\phi 1.5$ nm×2,000 nm).

<Shaping Test by Selective Laser Sintering (SLS)>

Each particulate resin composition was spread all over a shaping stage of a three-dimensional shaping apparatus for selective laser sintering to form a thin layer having a thickness of 0.1 mm. An area of 15 mm in length×20 mm in width on this thin layer was irradiated with laser using a 50 W fiber laser (manufactured by SPI Lasers Limited) equipped with a galvanometer scanner for YAG wavelengths under the following conditions, and 10 layers of this thin layer were stacked to prepare each shaped object.

Wavelength of laser: 1.07 μm
Beam diameter: 170 μm at the surface of the thin layer
Scanning interval: 0.2 mm
Laser: Output of 20 W
Scanning speed: 5,000 mm/sec
Standby temperature: Melting temperature of the resin composition—25° C.

<Evaluation Methods>

Determination of Melting Temperature of Resin Composition

Hot plates are each kept at 180° C., 185° C., 190° C., 195° C., and 200° C. All over an aluminum foil pan having a diameter of 5 cm, 1 g of a prepared resin composition is spread, and placed on each of the hot plates set at respective temperatures. The state of fusion of the resin composition was checked, and the temperature at which the start of fusion was recognized was determined as the melting temperature of the resin composition.

Measurement of Loss Modulus (Preparation of Samples)

The resin compositions were each pressurized at 30 kN for 1 minute using a pressure molding machine (manufactured by Npa SYSTEM CO., LTD., NT-100H) to be molded into a columnar sample having a diameter of about 8 mm and a height of about 2 mm.

(Measurement Procedure)

The temperature of a parallel plate included in the above-described apparatus was adjusted to 150° C. to melt the columnar sample prepared as described above. Thereafter, a load was applied in the vertical direction so that the axial force did not exceed 10 g-weight to firmly fix the sample to the parallel plate. In this state, the parallel plate and the columnar sample were heated to a measurement starting temperature of 250° C., and the viscoelastic data were measured while the parallel plate and the columnar sample were gradually cooled. The measured data were transferred to a computer with Windows 7 manufactured by Microsoft Corporation, and controlling the computer and collecting and analyzing the data were conducted through software (TRIOS) to read the value of the loss modulus (Pa) in the range of the melting temperature±20° C. of the resin composition.

The value of the maximum value of the loss modulus of the resin composition in the range of the melting temperature±20° C. to the minimum value of the resin composition in the range of the melting temperature±20° C. (maximum value/minimum value) was calculated.

(Measurement Conditions)

Measurement frequency: 6.28 radian/sec.

Settings for measuring distortion: The initial value was set to 0.1%, and measurement was conducted in the automatic measurement mode Correction to elongation of sample: Adjusted to the automatic measurement mode Measurement temperatures: Gradually cooled from 250° C. to 100° C. at a rate of 5° C. per minute Measurement interval: Viscoelastic data were measured every 1° C.

<Evaluation of Shaping Property>

The sizes of the longitudinal direction and the lateral direction were measured for each shaped object with a digital caliper (manufactured by Mitutoyo Corporation, Super Caliper CD67-S PS/PM ("Super Caliper" is a registered trade mark of the company)). Differences between the sizes to be produced (15 mm in length×20 mm in width) and the measured sizes of length and width were averaged to be used as the deviation in the shaping accuracy. On that occasion, the evaluation was conducted according to the following criteria.

A: The deviation in shaping accuracy is less than 0.1 mm, and a highly accurate object was obtained B: The deviation in shaping accuracy is less than 0.5 mm and 0.1 mm or more, and a shaped object as designed was obtained C: The deviation in shaping accuracy is 0.5 mm or more, and a shaped object as designed was not obtained

TABLE 1

| Example | Shaping technique | Maximum value/minimum value of loss modulus in the range of the melting temperature ±20° C. | Content by percentage of nanofiber (mass %) | Nanofiber diameter | Thermoplastic resin | Shaping accuracy |
|---|---|---|---|---|---|---|
| Comparative Example 1 | FDM | 5 | 0.5% | φ20 × 2000 nm | PA12 | C |
| Example 1 | FDM | 10 | 1% | φ20 × 2000 nm | PA12 | B |
| Example 2 | FDM | 100 | 30% | φ20 × 2000 nm | PA12 | B |
| Example 3 | FDM | 1000 | 70% | φ20 × 2000 nm | PA12 | B |
| Comparative Example 2 | FDM | 2000 | 75% | φ20 × 2000 nm | PA12 | C |
| Comparative Example 3 | SLS | 5 | 0.5% | φ20 × 2000 nm | PA12 | C |
| Example 4 | SLS | 10 | 1% | φ20 × 2000 nm | PA12 | B |
| Example 5 | SLS | 100 | 30% | φ20 × 2000 nm | PA12 | B |
| Example 6 | SLS | 1000 | 70% | φ20 × 2000 nm | PA12 | B |
| Comparative Example 4 | SLS | 2000 | 75% | φ20 × 2000 nm | PA12 | C |
| Example 7 | SLS | 100 | 30% | φ3 × 200 nm | PA12 | A |
| Example 8 | SLS | 100 | 30% | φ3 × 1000 nm | PA12 | A |
| Example 9 | SLS | 100 | 30% | φ20 × 200 nm | PA12 | A |
| Example 10 | SLS | 100 | 30% | φ20 × 1000 nm | PA12 | A |
| Comparative Example 5 | SLS | 5 | 30% | φ1.5 × 2000 nm | PA12 | C |

As shown in Table 1, in the case where the content by percentage of the polysaccharide nanofiber was 1 to 70 mass %, and the maximum value of the loss modulus of the resin composition in the range of the melting temperature±20° C. was 10 to 1,000 times the minimum value of the loss modulus (Examples 1 to 10), the shaping accuracy was high. Particularly in the case where the minor axis of the nanofiber was 3 to 20 nm, and the major axis was 200 to 1,000 nm (Examples 7 to 10), the shaping accuracy was high. It is inferred that a fine network structure was formed by the nanofibers when the resin composition was melted, and therefore the shaping accuracy was enhanced.

In contrast, when the content by percentage of the nanofiber was small, the ratio of the maximum value to the minimum value of the loss modulus of the resin composition in the range of the melting temperature of +20° C. was excessively small, and the shaping accuracy was low (Comparative Example 1 and Comparative Example 3). It is inferred as a primary factor that in any of the cases, a sufficient network structure was not formed in the molten resin composition by the nanofibers, and further, it was hard for the viscosity of the molten resin composition to increase, so that a time was required until the shape of the molten resin composition was fixed (until the viscosity of the resin composition increased).

In addition, in the case where the content by percentage of the nanofiber was excessive, the ratio of the maximum value to the minimum value of the loss modulus of the resin composition in the range of the melting temperature±20° C. was excessively large, and the shaping accuracy was low (Comparative Example 2 and Comparative Example 4). It is inferred that in any of the cases, the shape of the resin composition had been fixed (the viscosity of the resin composition had increased) before the resin composition was integrated with adjacent filamentous or particulate resin compositions.

Further, in the case where a nanofiber (a carbon nanotube) other than polysaccharide nanofibers was used, the ratio of the maximum value to the minimum value of the loss modulus of the resin composition in the range of the melting temperature±20° C. was small, and the shaping accuracy was not enhanced (Comparative Example 5). It is inferred that a network structure was not formed in the resin composition by the carbon nanotube.

The present application claims the benefit of Japanese Patent Application No. 2017-003200, filed on Jan. 12, 2017, the disclosure of which is incorporated herein by reference in its entirety.

INDUSTRIAL APPLICABILITY

According to the resin composition of the present invention, a three-dimensionally shaped object can be formed with good accuracy by either one of fused deposition modeling and selective laser sintering. Therefore, it is considered that the present invention contributes to further spread of three-dimensional shaping methods.

The invention claimed is:

1. A production method for a three-dimensionally shaped object, the method comprising:
    forming a thin layer from a powder material comprising a particulate resin composition, and
    selectively irradiating the thin layer with laser light, thereby forming a shaped object layer comprising a plurality of the resin compositions melt-bonded to one another, wherein
    the forming of the thin layer and the irradiating with the laser light are repeated a plurality of times to stack the shaped object layers, thereby shaping a three-dimensionally shaped object,
    the particulate resin composition comprises resin particles containing a polysaccharide nanofiber and a thermoplastic resin,
    the particulate resin composition has a content of the polysaccharide nanofiber of 1 to 70 mass %, and
    the composition has a melting temperature Tm, a viscosity of the composition changes within a range of Tm −20° C. to Tm +20° C, and a maximum value of loss modulus in the range is 10 to 1,000 times a minimum value of the loss modulus in the range.

2. The production method according to claim 1, wherein the polysaccharide nanofiber has a minor axis of 3 to 30 nm and a major axis of 200 to 2, 000 nm.

3. The production method according to claim 1, wherein the polysaccharide nanofiber comprises a cellulose nanofiber.

4. The production method according to claim 1, wherein the particulate resin composition consists of the resin particles, and the resin particles are spherical.

5. The production method according to claim 1, wherein the selectively irradiating is carried out under a reduced pressure or in an inert gas atmosphere.

* * * * *